(12) United States Patent
Skottene et al.

(10) Patent No.: US 11,709,024 B2
(45) Date of Patent: Jul. 25, 2023

(54) THERMAL ENERGY BATTERY

(71) Applicant: EnergyNest AS, Billingstad (NO)

(72) Inventors: Martin Skottene, Heggedal (NO); Christopher Greiner, Vøyenenga (NO); Pål G. Bergan, Nesøya (NO); Nils Høivik, Nesøya (NO)

(73) Assignee: EnergyNest AS, Billingstad (NO)

( * ) Notice: Subject to any disclaimer, the term of this patent is extended or adjusted under 35 U.S.C. 154(b) by 46 days.

(21) Appl. No.: 17/612,494

(22) PCT Filed: Jun. 12, 2020

(86) PCT No.: PCT/NO2020/050159
§ 371 (c)(1),
(2) Date: Nov. 18, 2021

(87) PCT Pub. No.: WO2020/251373
PCT Pub. Date: Dec. 17, 2020

(65) Prior Publication Data
US 2022/0214119 A1  Jul. 7, 2022

(30) Foreign Application Priority Data

Jun. 12, 2019 (NO) .............................. NO20190723
Jul. 5, 2019 (NO) .............................. NO20190853

(51) Int. Cl.
*F28D 20/02* (2006.01)
*F01K 1/10* (2006.01)
(Continued)

(52) U.S. Cl.
CPC .............. *F28D 20/028* (2013.01); *F01K 1/10* (2013.01); *F01K 1/12* (2013.01); *F28D 20/0056* (2013.01); *F28D 2020/0082* (2013.01)

(58) Field of Classification Search
CPC ................ Y02E 60/14; F01K 1/00–20; F01K 3/00–267; F01K 13/02; F01K 13/006;
(Continued)

(56) References Cited

U.S. PATENT DOCUMENTS 4,192,144 A * 3/1980 Pierce ...................... F01K 3/00
165/104.34
5,269,145 A * 12/1993 Krause ...................... F01K 1/08
60/659

(Continued)

FOREIGN PATENT DOCUMENTS

CN   208971151 U    6/2019
DE   102014216597 A1  2/2016
(Continued)

*Primary Examiner* — Mickey H France
(74) *Attorney, Agent, or Firm* — Bradley Arant Boult Cummings LLP

(57) ABSTRACT

Thermal energy battery, comprising: an evaporator-condenser thermal energy storage (ec-TES), with an end for vapor and an end for liquid, comprising one-phase stationary material storing at least 70% of the thermal energy stored within the ec-TES, a storage tank for vapor and liquid (ST), with a vapor part at a higher elevation and a liquid part at a lower elevation, a vapor line, arranged to the vapor end of the ec-TES, for inlet and outlet of vapor, a liquid line arranged between the liquid end of the ec-TES and the liquid part of the ST, a tank vapor line arranged from the vapor part of the ST to the vapor line or the vapor end of the ec-TES, and an evaporation control valve (CV6) in the tank vapor line.

19 Claims, 2 Drawing Sheets

(51) Int. Cl.
*F01K 1/12* (2006.01)
*F28D 20/00* (2006.01)

(58) Field of Classification Search
CPC ....... F01K 17/00–06; F28D 20/00–028; F28D 2020/0004–0095; F03G 4/063; F03G 6/071
See application file for complete search history.

(56) References Cited

U.S. PATENT DOCUMENTS

| | | |
|---|---|---|
| 2008/0022713 A1 | 1/2008 | Jacobi |
| 2011/0162400 A1 | 7/2011 | Reich et al. |
| 2015/0219403 A1 | 8/2015 | Olcese |
| 2018/0292097 A1 | 10/2018 | Specter |

FOREIGN PATENT DOCUMENTS

| | | |
|---|---|---|
| EP | 2894330 A1 | 7/2015 |
| JP | 2013216763 A | 10/2013 |
| WO | WO-2015093980 A1 | 6/2015 |
| WO | WO-2016099289 A1 | 6/2016 |
| WO | WO-2016099290 A1 | 6/2016 |
| WO | WO-2018201193 A1 | 11/2018 |
| WO | WO-2019038292 A1 | 2/2019 |
| WO | WO-2019110655 A1 | 6/2019 |

\* cited by examiner

THERMAL ENERGY BATTERY

TECHNICAL FIELD

The present invention relates to thermal energy batteries and operation thereof. More specifically, the invention provides a thermal energy battery for integration into or coupling to a power plant, an energy storage system or an energy delivery system, or any combinations thereof. The thermal energy battery is feasible for thermal energy charging, storage and discharging saturated or superheated vapor according to demand and is feasible for operation without any pump or compressor as part of the thermal energy battery.

BACKGROUND ART

For steam-based electricity production, used extensively and dominating the global market for production of electricity, the possibility of storing the thermal energy from superheated steam or other vapor, at shutdowns, startups and scaling production up or down, would represent a big advantage.

Steam-based electricity production is typically related to energy sources based on combustion, be it based on fossil fuel or biofuel, and nuclear energy. Also, solar thermal energy is relevant.

For energy-intensive industries, typically integrated into a steam network where steam is used as a Heat Transfer Fluid, where the heat consumers are following batch processes, the possibility of storing the thermal energy directly from the steam would represent a big advantage, both in terms of reducing waste steam, but also to stabilize the steam grid where the batch processes creates fluctuations either due to the limited flexibility of the boilers or due to time-shift in the different energy processes in the system.

Reduced waste of energy is considered a key factor for cost reduction of energy supply from all types of renewable energy sources, combustion-based energy sources and nuclear based energy, as well as for energy-intensive industries.

Furthermore, a missing link for facilitating the shift towards sustainable energy production is energy storage at affordable cost. Wind energy and solar energy are variable, and reduced cost for energy storage would enhance the use of wind energy and solar energy. An energy storage system integrated into a power plant will enhance the plant's flexibility which in turn enables more intermittent electricity production from solar and wind energy. Electrification of the industry with integration of an energy storage is another link, where steam will be generated by electricity and stored in the storage during periods with low electricity prices, when there is excess energy from solar and wind.

With affordable energy storage, energy waste can be reduced, and renewable energy can be used more widely, displacing fossil fuels. Connected electric generators can easier be operated at optimal operation points. The storages can be distributed locally, reducing the burden on the grid.

In addition, simplification of power plants, increased versatility with respect to operation parameters, reducing cost and complexity, will also be beneficial, if achievable.

Currently, thermal energy batteries are typically latent heat batteries, based on solid-fluid phase change materials for thermal energy storage, as an essential component. For example, the CCT (Climate Change Technologies Pty Ltd) Energy Storage TED—thermal energy device—is based on latent heat as an essential component for functionality, cf. patent publication WO 2018/201193 A1. Another example is described and illustrated in patent publication US 2015/0219403 A1. In paragraphs 18 and 19 of US 2015/0219403 A1, it is described that direct thermal energy storage in concrete has been found to create reliability problems and low efficiency. In addition, it is described that thermal storage systems with direct steam generation according to the state of the art are more complex than storage systems using thermal oil, and therefore their estimated cost is higher for large plants.

The objective of the present invention is to provide an alternative thermal energy battery. State of the art in sensible heat thermal energy storage may be the existing storage technology of the Applicant. The relevant technology is described and illustrated in the patent publications WO 2015/093980 A1, WO 2016/099289 A1, WO 2016/099290 A1 and WO 2019/110655 A1.

SUMMARY OF INVENTION

The invention meets the objective by providing a thermal energy battery comprising:
  an evaporator-condenser thermal energy storage (ec-TES), with an end for vapor and an end for liquid, comprising one-phase stationary material storing at least 70% of the thermal energy stored within the ec-TES,
  a storage tank for vapor and liquid (ST), with a vapor part at a higher elevation and a liquid part at a lower elevation,
  a vapor line, arranged to the vapor end of the ec-TES, for inlet and outlet of vapor,
  a liquid line arranged between the liquid end of the ec-TES and the liquid part of the ST,
  a tank vapor line arranged from the vapor part of the ST to the vapor line or the vapor end of the ec-TES, and
  an evaporation control valve (CV6) in the tank vapor line.

The vapor and the liquid are in many embodiments steam and water, respectively. In other embodiment the vapor and liquid are an organic compound or a mixture of compounds. Cyclo-pentane is one example. Iso-butane is another example. Mixtures feasible for use in organic Rankine cycles, such as R134a, or R134a and iso-butane, are further examples.

The phrase "a tank vapor line arranged from the vapor part of the ST to the vapor line", means any operative arrangement for fluid flow as intended. A combined coupling to the vapor end of the ec-TES of the vapor line and the tank vapor line is one embodiment, another is a three-way coupling in the vapor line at elevation above, equal to or below the vapor end of the ec-TES. A further embodiment is separate vapor line and tank vapor line inlets to the vapor end of the ec-TES, with coupling combining said vapor lines inside the vapor end of the ec-TES. In a preferable embodiment, a three-way coupling can be located at a lower elevation even though the vapor end of the ec-TES should be at the highest elevation. Actually, the three-way coupling preferably is at a lower elevation than the vapor part of the ec-TES in case of trip, when water spray continues to feed condensate to the system and steam source lines are closed, wherein the cold water will enter the vessel and not the ec-TES.

Terminology such as vapor end, liquid end, vapor part, liquid part, vapor line, tank vapor line and liquid line, refers to the contents of the units or parts/ends thereof or lines/conduits, under normal operating conditions. Vapor end means a part of, a section of, towards one end of the ec-TES filled with vapor at normal operation. Liquid end means a part of, a section of, towards an end of the ec-TES filled with liquid at normal operation. The liquid end and the vapor end are typically oppositely oriented in an elongated ec-TES, but not necessarily.

Terminology like high elevation and low elevation, higher elevation and lower elevation, are relative within one unit.

The ec-TES will in operation contain two-phase vapor-liquid as a Heat Transfer Fluid (HTF), with single-phase vapor at the vapor end and single-phase liquid, or in substance liquid. Initially, the liquid mass fraction can be 10-20%, in rapid cycling, the mass fraction liquid may stabilize at typically 40-60%, but for longer cycling 70 or 80%, at the liquid end. Pressure-temperature and resulting evaporation and condensation and flow of HTF within the TES, typically control the processes providing a liquid end and a vapor end of the ec-TES. If the vapor end is at a higher elevation and the liquid end is at a lower elevation, which is not obligatory, gravity will contribute to said processes within the e-TES.

The "evaporator-condenser thermal energy storage (ec-TES), comprising one-phase stationary material storing at least 70% of the thermal energy stored within the ec-TES", means that the ec-TES is no storage tank containing a larger volume filled with HTF during normal operation, and no thermal energy storage containing phase change material, except HTF, the heat transfer fluid used for charging and discharging thermal energy. More specifically, if the HTF, thermal insulation, support structure and space (typically air) between or around the modules and the elements within a module is disregarded, the ec-TES consists of only one-phase thermal energy storage material, preferably solid one-phase material, up to 90 or 100% by weight, and above 60%, more preferably above 70 or 80% by volume. Disregarding thermal insulation and space between or around modules and elements within modules of the ec-TES, the only ec-TES volume not being one phase thermal energy storage material, is volume inside conduits for flow of HTF and structural material, as will be clear by studying the further description. Further disregarding the inherent minor storage effect of the HTF itself, all thermal energy stored in the ec-TES is sensible heat thermal energy typically stored in concrete, rock, stones, transformer oil, or most preferably, a combination of concrete and steel, with concrete as the major part material and steel for piping, reinforcement and structural frames/elements. In a typical ec-TES, filled with HTF, the inherent minor thermal energy storage of the HTF itself is about 5%, while about 95% is stored in solid one phase material of the ec-TES. The volume of one-phase thermal energy storage material is large compared to the HTF volume within the ec-TES, preferably larger, more preferably 2, 3, 5 or 10 times larger.

The superheater storage, if included, preferably has identical or similar structural design as the ec-TES, but can be of different size or scale, according to demand.

HP—higher pressure—and LP—lower pressure—are relative terminology. A thermal energy battery of the invention, fully charged with for example HP steam, can initially discharge said steam at close to HP conditions, before pressure reduces towards the consumer at LP conditions.

The evaporation control valve enables control of discharging by merely operating said valve. Without the evaporation control valve and without the tank vapor line, ST is connected in series with ec-TES, and with this configuration there will be condensate or two-phase vapor/condensate at the vapor end of the ec-TES during discharge. To supply dry steam to the steam recipient, condensate could be separated from the steam in a steam trap, where the condensate must either be drained or return to ST by a pump. Such a solution would be less efficient, more complex and more costly than having the ST vapor line. To control dry, single-phase vapor at the vapor end during discharge, vapor must be released from ST to reduce the condensate temperature below the ec-TES temperature. Heat transfer requires a temperature difference between ec-TES and vapor/condensate, where the required temperature difference increases with power.

The thermal energy battery preferably further comprises one or both of a check valve in the tank vapor line, open for flow in direction from the ST and closed for flow in the opposite direction, and a flow control component in the vapor line between a vapor source/recipient and the connection point of the vapor line and the tank vapor line.

The check valve enables natural circulation during low charging flow rate, for more efficient heat balancing between the ST and the ec-TES. However, the thermal energy battery can be operated without a check valve, by keeping the evaporation control valve closed during the charge process, to direct the steam flow through the ec-TES before entering the ST.

The flow control component in the vapor line arranged between the source/recipient and the connection point of the vapor line and the tank vapor line provides increased functionality. Control valves, compressors and turbines are examples on flow control elements.

For many embodiments, the thermal energy battery preferably comprises a superheater thermal energy storage (superheater TES), comprising one-phase stationary material storing at least 70% of the thermal energy stored within the superheater TES, arranged inline or to the vapor line between sources/recipients and the connection point of the vapor line and the tank vapor line. All power systems with sources delivering and/or users feasible for superheated vapor, such as superheated steam, may take advantage of a thermal energy battery of the invention with a superheater TES. The superheater TES enables charging, storage and delivery of superheated vapor, where the HTF in the superheater TES is vapor phase above saturation level, such as superheated steam, for effective generation of electricity. The superheater TES also provides de-superheating of the vapor when charging, ensuring that the vapor from the vapor source is not causing thermal shock to the ec-TES. In some preferable embodiments, the vapor line includes an inlet and/or an outlet for not superheated vapor for sources and users not delivering or requiring superheated vapor, respectively. In some preferred embodiments, the superheater TES comprises pipe heat exchangers and piping components of so-called super alloys, typically nickel based alloys such as Inconel, enabling higher temperatures and/or pressures than carbon steel.

Both the ec-TES and the superheater TES will contain a one-phase stationary material for thermal energy storage different or separated from the HTF described above. The thermal energy is transferred from the HTF to the storage material during charging, and oppositely, from the storage material to the HTF during discharging.

In some embodiments, the thermal energy battery comprises separate vapor lines for inlet and outlet of vapor, wherein the tank vapor line preferably is arranged to an outlet vapor line arranged to the vapor end of the ec-TES, and each vapor line includes a flow control component. This can provide increased versatility, for example when having many thermal batteries of the invention arranged in parallel, or at different pressure-temperature levels. Within one pressure-temperature level, defined as being within inlet and outlet pressure and temperature of a battery, several thermal energy batteries of the invention can be arranged in parallel.

When several pressure levels, such as in combined cycle power plants, the thermal energy battery may have separate inlets and outlets of vapor to the different pressure levels in the power plant. For example, the first part of charging can be operated with the IP (intermediate pressure) line as steam source, and the last part of charging can be operated with the HP (high pressure) line as steam source. The first part of discharging can be operated with the IP line (or the inlet of the IP turbine) as steam recipient, and the last part of discharging can be operated with the LP (low pressure) line or the LP turbine. By operating with the IP line in addition to the HP and the LP lines, the efficiency of the thermal energy battery will increase.

The thermal energy battery preferably further comprises one or more of the features as follows, in any combination:
  for embodiments with superheater TES, a superheater bypass line with a valve (CV4), arranged so as to bypass part or all the vapor instead of flow through the superheater TES arranged inline to the vapor line;
  for embodiments with superheater TES, a valve (CV5) in the vapor line between the superheater TES and the connection point of the vapor line and the tank vapor line;
  a valve (CV1) arranged in the vapor line, controlling a supply of HP (high pressure) vapor to an inlet;
  a valve (CV2) arranged in the vapor line, controlling the delivery of LP (low pressure) vapor from an outlet;
  a line with a valve (CV3) for injecting HP condensate to the vapor line, for temperature control to avoid overheating, between the source and superheater TES, or for embodiments with no superheater TES, between the source and the connection point of the vapor line and the tank vapor line;
  a drainage line with a valve (CV7), arranged from the liquid line; and
  an electric heater in the storage tank—ST—for liquid and vapor, in the lower liquid part thereof, and preferably with the lower liquid part of the ST at lower elevation than the liquid end or part of the ec-TES.

The ec-TES, and the superheater TES if present, preferably consists of one-phase material, more preferably solid-state one-phase material, meaning that said storages are sensible thermal energy storages where the thermal energy storage material always is in solid state. The fluid used for charging and discharging, the heat transfer fluid (HTF), is however vapor, received through an inlet when charging and delivered through an outlet when discharging, with said inlet and said outlet, being a combined inlet and outlet or separate inlet and outlet, arranged in a vapor side of the thermal energy battery. The HTF will in part condense, and all or most of the condensed HTF will be stored in the storage tank for vapor and liquid, while some of the condensed HTF may be stored in a lower elevation part of the ec-TES, the liquid end thereof, which will be clear from the description to follow.

Preferably, the ST, at least the liquid/lower part thereof, is located at an equal elevation or a lower elevation than the liquid end of the ec-TES.

Preferably, the elevation of the vapor end of the ec-TES is above, preferably far above, the vapor part of the ST.

In some use cases, the energy source is electric power and not waste heat or other kind of steam sources from an external steam cycle. Then there are two options, the first is to use an external conventional electric boiler and charge the thermal energy battery in the same way as any other steam source, with no implications or changes of the thermal energy battery as described. The other option is to integrate the electric resistive heating elements directly inside the existing ST, in which a small extension of the thermal energy battery is required. With this option, a new liquid line to the ST is preferred, wherein the ST will be filled with liquid during the charge cycle. The heating elements inside the ST will transfer heat to the liquid and vapor, whereby the liquid will boil and evaporate. The vapor will flow through the ec-TES preferably by natural circulation whereby a check valve arranged inline on the existing liquid line is preferred. Alternatively, circulation is assisted by a circulation pump arranged inline on the existing liquid line. For embodiments with a superheater TES, a new line arranged from the vapor part of the ST to the vapor line between the superheater TES and the steam recipient is required. Within this line, a conventional electric superheater will provide the required level of superheated vapor into the superheater TES. During discharging, the two additional lines (the liquid supply line and for embodiments with superheater TES, the electric superheater line) will be closed, the heating elements are turned off, and the thermal energy battery is operated in the same way as normal.

The ec-TES, and the superheater TES if present, can have numerous embodiments. However, the ec-TES, and the superheater TES if present, preferably comprises numerous closely arranged concrete thermal energy storage elements. All or most of the concrete thermal energy storage elements preferably comprises pipe heat exchangers fully embedded in the concrete between a pipe heat exchanger inlet and a pipe heat exchanger outlet in the same end or part of the element, an outer shell, preferably a metal shell, being a concrete casting form, ring armoring and fluid leakage confiner, wherein the ec-TES vapor line is at a higher or highest elevation and the ec-TES liquid line is at a lower or lowest elevation. The elements are preferably arranged in a frame structure, termed cassettes, enabling prefabrication, testing, transport and installation of each cassette as one-unit, which cassettes can be stacked or arranged closely, preferably with all piping and coupling in one end or side only. The concrete, the thermal energy storage material of the elements, consists of more than 70%, more preferably at least 80% or 90% of the weight of each thermal energy storage element.

The thermal energy battery of the invention is preferably arranged inside thermal insulation.

The invention also provides a method of operating a thermal energy battery of the invention. The method is distinguished by the steps: charging by supplying HP vapor, higher pressure vapor, from a source through the vapor line, with the tank vapor line closed or partly closed for the vapor by a closed or partly closed evaporation control valve or a check valve in the tank vapor line, until a maximum or desired pressure and temperature are reached, and discharging LP vapor, lower pressure vapor, to a recipient through the vapor line, controllable at least by the evaporation control valve, until a minimum or desired temperature and pressure is reached.

The evaporation control valve controls the evaporation/boiling process, by controlling the flashing of steam and the condensate flow through the ec-TES, and thereby impacting the temperature difference between the storage material and the HTF.

The feature "with the tank vapor line closed or partly closed for the vapor by a closed or partly closed evaporation control valve or a check valve in the tank vapor line", means that all or in substance all HTF flows in the direction during charge: vapor line, ec-TES, liquid line, ST, and if open, further flow of vapor through the tank vapor line and into the ec-TES for further condensing until a pressure-temperature balance between the ec-TES and the ST is reached.

Preferably, discharging is controlled by the evaporator control valve in order to maintain an above saturation condition, to prevent liquid reaching the vapor end of the ec-TES.

Preferably, charging takes place with the evaporation control valve closed, whereby all or most of the vapor condensed in the ec-TES is accumulated as liquid in the ST by natural processes. Alternatively, charging takes place with the evaporation control valve open with a check valve installed in the tank vapor line, to enable natural circulation and thus enhance the heat balancing between the ec-TES and the ST.

The invention also provides use of the thermal energy battery of the invention, for storing thermal energy from a source and delivering thermal energy to a recipient.

A deeper understanding of the present invention is achievable by studying the detailed description and the illustrated embodiments.

DETAILED DESCRIPTION OF THE INVENTION

Figure 1:
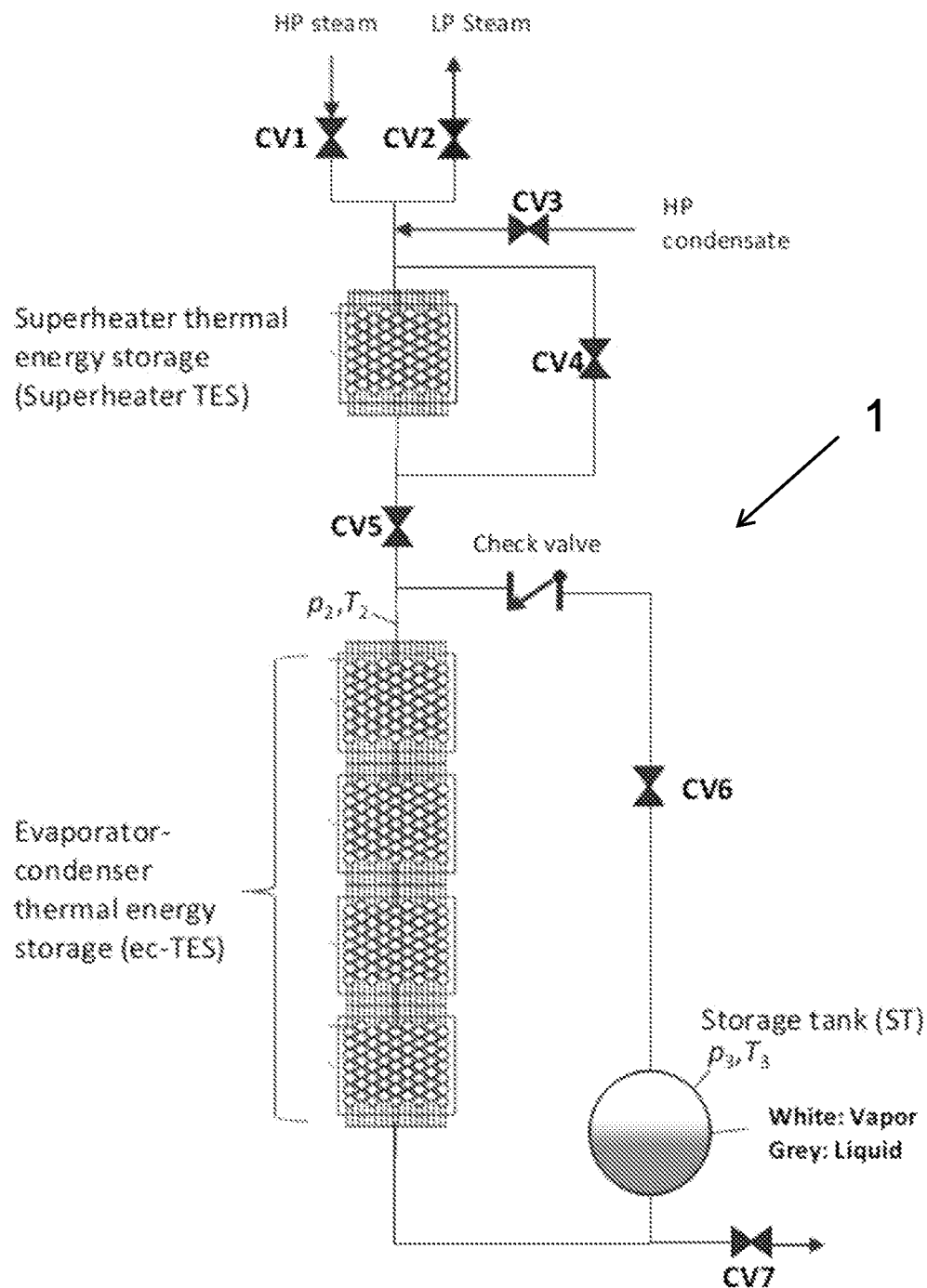
FIG. 1 illustrates a preferred embodiment of the invention, with a superheater TES.

Reference is made to FIG. 1, illustrating a thermal energy battery of the invention and preferable methods for operation thereof, with steam/water as heat transfer fluid. CV means control valve, controlled based on parameters such as pressure, temperature, flow or level, (the parameters are measurable with operatively arranged commercially available sensors, not illustrated) as described below.

Charge:
CV1 controls the flow rate of HP steam
CV2 and CV7 are closed
CV3 controls water spray from HP (high pressure) condensate to reduce steam temperature to carbon steel limitation, if needed
CV4 controls the flow velocity in the superheater TES below a maximum limit to prevent Flow Accelerated Corrosion (FAC)
CV5 is 100% open
CV6 (evaporation control valve) is closed if a check valve is not included, or open if a check valve is included Discharge:
CV2, CV4 and CV5 operate simultaneously to control both the flow rate and the temperature of the outlet steam flow
CV1, CV3 and CV7 are closed
CV6 (evaporation control valve) controls $T_2$ to be a few degrees (example given, but not limited to, 10-20° C.) higher than saturation temperature. The purpose is to make sure that no condensate will reach the outlet of the ec-TES Stop:
CV7 will drain remaining water in the system (the ST is preferably located at the lowest elevation of the ec-TES). Some small amount of water may not be evaporated and discharged due to heat losses in the system, especially after a long idle time A further thermal energy battery explanation is as follows:

Charge:
Steam is de-superheated in superheater TES and condensed in ec-TES.
For high flow rate, the frictional pressure loss is higher than the hydrostatic pressure, $p_2 > p_3$. Any uncondensed steam will be separated in the ST and contribute to pressure build-up.
Pressure build-up increases the condensation rate in the ec-TES due to larger delta temperature between the sensible storage material and saturation.
When the flow rate is reduced, or the condensation rate is high, the further process is dependent on the check valve:
A system without a check valve in the tank vapor line: All the steam will be condensed and sub-cooled in the ec-TES. The sub-cooled water enters the ST and mixes with the saturated water. In this way the colder temperature in the ec-TES is transferred to the higher temperature in the ST, and the temperatures become equal over time.
A system with a check valve in the tank vapor line: The hydrostatic pressure becomes higher than the frictional pressure loss, $p_2 < p_3$, and steam is recycled through the check valve and further condensed. Such natural circulation continues until the sensible storage material of the ec-TES and the saturation temperature are equal, and the pressure stabilizes. This process of equalization of temperatures is faster than the above described process with no check valve.
The storage is fully charged when the pressure reaches the maximum operating pressure.

Discharge:
The storage is depressurized by discharging low pressure steam, preferably controlled by CV2 and CV5
Initially, steam from the pressure vessel is released by opening CV6 (evaporation control valve). This results in a larger temperature difference between the sensible storage material and condensate, furthermore CV6 controls the amount of steam going directly to the superheater TES and the amount of condensate through the ec-TES.
The steam volume in the ST will expand and push the condensate through the ec-TES.
If some condensate gets closer to the steam end of the ec-TES, the $T_2$ temperature will be reduced. Then steam is released through CV6, and the two-phase condensate/steam region is stabilized some distance below the steam end of the ec-TES.
The outlet steam flow rate and temperature are preferably controlled by CV2, CV4 and CV5. Due to a high temperature drop of a control valve with a high pressure drop, the outlet temperature can be controlled by CV2 and CV5 within a given range. The bypass valve CV4 can expand this range to lower temperatures. By controlling the outlet temperature, a constant temperature can be provided to the heat consumers during the entire discharge cycle, even though the temperature of the sensible storage material in the superheater TES is reduced. Alternatively, the steam outlet temperature can be controlled by CV3 by water attemperation (while flow rate is controlled by CV2), and in this case CV4 and CV5 can be removed. With this alternative the constant steam outlet temperature will be lower compared to what is possible with temperature control by CV4 and CV5.

The discharge steam flow will stop when the storage is fully discharged due to low pressure. Valve CV2 and CV5 is fully open, and the flow rate drops below the target value.

The thermal energy battery of the invention can for example be integrated into a CCPP, a combined cycle power plant. The HP inlet can be coupled to receive HP steam from upstream a HP turbine. The LP outlet can be coupled to deliver LP steam to a LP turbine. HP (high or higher pressure) and LP (low or lower pressure) are relative to each other. HP is typically 30-180 bar. LP is typically 1 to 20-40 bar. The HP temperature is typically 150-420° C. The ec-TES and ST operating temperature is typical at 150-350° C., corresponding to saturation condition at operating pressure. The superheater TES will typically increase the temperature 30-120° C. above saturation temperature at LP outlet. The difference in pressure between HP and LP is typically 20 bar as a minimum, to obtain a satisfactory storage capacity within the ec-TES. When this difference is increased, more energy can be stored in the ec-TES.

Any source of HP steam can be used, and any source of LP steam can be connected, or any feasible vapor-liquid, in principle.

In the thermal energy battery of the invention, no pump or compressor is required for flow. The pressure drives the flow between HP inlet and LP outlet. The HP inlet and the LP outlet are in many embodiments, as separate structures, or where either charging or discharging is acceptable, the same structure. More specifically, the condensation in the ec-TES and in the tank results in substantial contraction of the fluid (steam/vapor) volume slowing down the pressurization process, causing the effect of allowing more steam/vapor to flow into the storage during charging where the temperature of the sensible one-phase media increases and condensate accumulates in the storage tank (ST). The storage is fully charged when the tank is full of condensate and the system pressure reaches the steam source pressure, hence no pump or compressor is required since the steam flows into the storage by the pressure difference of the steam/vapor source and internally in the system. When discharging the storage, the reverse process takes place, wherein the evaporation in the ec-TES and in the tank substantially increases the fluid volume slowing down the de-pressurization process, allowing steam/vapor to flow back into a steam consumer, for example a Rankine cycle. The storage is fully unloaded when the tank is empty of condensate and the system pressure reaches the steam consumer pressure, hence no pump or compressor is required since the steam flows out of the storage by the pressure difference.

The lower end of the thermal energy battery is closed during all operation of charging and discharging, hence no liquid enters or exits the thermal energy battery during normal operation. The vapor or steam do enter the battery in one end and leave the battery in the same end; the thermal energy battery vapor end. During charging and discharging, the ec-TES, and the ST, in substance follows each other with respect to temperature, up or down, respectively. During charging, either due to the check valve or the closed evaporation control valve, the steam flows into the ec-TES and not into the ST. During charging, the steam/condensate flows counterclockwise (related to the illustration, not literally) into the ec-TES and then into the ST. The check valve enables recycled steam from the ST to mix with the steam from the heat source by the process of natural circulation. Without a check valve and with an open evaporation control valve, recycling of steam by natural circulation in the same direction as described above is possible only when there is low charge flow from the heat source.

A feasibility study has been completed, with a thermal battery of the invention with steam integrated into a CCPP. The thermal energy battery was operated from 5-75 bar, storing 154 MWh in total, where 34% of the thermal energy was stored in the ST, and 66% of the thermal energy was stored in the ec-TES and the superheater TES. The findings are full storage of all the dumped steam during shut down and startup, and the flexibility of the plant is increased significantly. This eliminates fuel consumption of an auxiliary boiler and enables renewable energy on the power grid.

Electricity from solar and wind sources can be transformed to thermal energy, for input in a Rankine cycle power plant, preferably a combined heat and power plant, with one or more thermal energy batteries of the invention connected to the power plant for adapting production to demand and levelling out variations in production from wind and solar sources.

The battery allows a very high variation in charge flow rates. For the highest flow rates, two-phase steam/water may exit the liquid end of the ec-TES, however, the steam and water are separated in the ST. It may also be necessary to bypass some of the steam directly into the ST, to limit the flow velocity in the ec-TES below a maximum value defined for two-phase flow. The heat from the un-condensed steam in the ST can be transferred to the ec-TES after the charge flow rate is completed, by opening the evaporation control valve and enable natural circulation. The thermal energy battery of the invention, with a combination of high-pressure vessels and solid-state thermal energy storages, operated together with control valves as described and illustrated, enables this high variation in operational flow rates, because no condensate is returned from the system during the charge operation. This design with the combination of superheater modules (superheater TES) and evaporator/condenser modules (ec-TES) and the pressure vessel(s) (ST) has several benefits:

High flexibility of operation. A high variation in flow rate is accepted for the reasons described above.

High energy efficiency: The energy density in the pressure vessels is high, and no hot water is wasted in the thermal energy battery. The high-quality energy (evaporation and superheating) is mainly stored in the modules.

Low cost: The combination of modules and pressure vessels minimizes the size of the thermal energy battery. In the pressure vessels, part of the steam is evaporated in the vessel itself, like a steam accumulator, whereas the majority is evaporated by draining the vessel into the evaporator modules. In this way the entire volume of the pressure vessel is actively used, and the modules is used only for evaporation of the vessel drainage and superheating the steam. This combination minimizes the thermal energy battery size and the CAPEX.

Easy control of evaporation rate during discharge with a single valve controlling the flashing of steam in the pressure vessel and the condensate drainage through the evaporator modules.

High discharge temperature: The superheater modules can be designed to provide the required temperature for the steam consumers (limited by the maximum temperature for carbon steel)

In summary, the thermal energy battery of the invention, with a combination of high-pressure vessels (ST) and solid-state thermal energy storages represents an inventive solution based on the following:

The slow dynamics of the solid-state TES is overcome by the ST, as this can accumulate all the energy not transferred to the solid-state material in the ec-TES and allow a re-distribution of this energy via natural circulation. A high condensation rate is achieved by a high temperature difference between ec-TES and steam, and a large surface area within the ec-TES for heat transfer. Moreover, the inefficiency of using the vessel as a steam accumulator is overcome by allowing the full drainage of the otherwise "dead volume" of liquid and supplying this liquid as "feedwater" for the evaporation of liquid to vapor in the ec-TES. A solid-state storage can further superheat all the vapor in cases where superheated vapor is required and/or beneficial. Hence the combined solution overcomes the main challenges of both technologies separately, while harvesting the main benefits of both, thus providing the most cost-effective solution for storage of thermal energy in two-phase liquid-vapor systems.

The superheater TES, as well as the ec-TES, are preferably according to the design of the Applicant, as described and illustrated in the patent publications WO 2015/093980 A1, WO 2016/099289 A1 and WO 2016/099290 A1, all of which are hereby incorporated in their entirety by reference. However, also other sensible heat thermal storages/batteries can be feasible.

Figure 2:
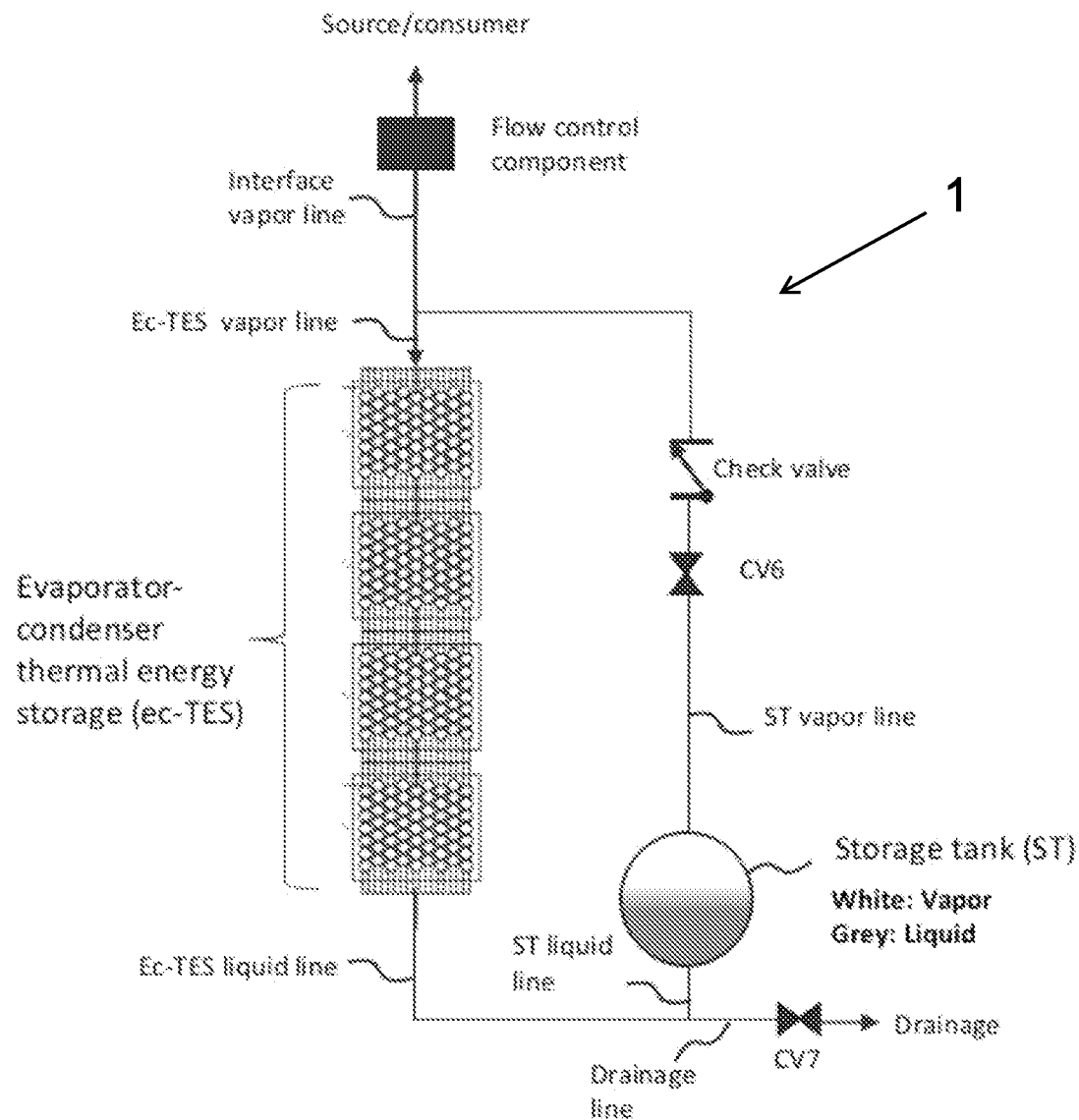
FIG. 2 illustrates a preferred embodiment of the invention, without a superheater TES.

Further reference is made to FIG. 2, illustrating an embodiment of a thermal energy battery of the invention without superheater TES, feasible for sources without superheated vapor. The embodiment is in principle identical with the embodiment of FIG. 1, except that no superheater, and optionally no check valve, are included. The flow control component corresponds to CV5, and evaporation control valve corresponds to CV6.

The invention claimed is:

1. A thermal energy battery comprising:
   an evaporator-condenser thermal energy storage (ec-TES), with an end for vapor and an end for liquid, comprising one-phase stationary material storing at least 70% of the thermal energy stored within the ec-TES;
   a storage tank for vapor and liquid (ST), with a vapor part at a higher elevation and a liquid part at a lower elevation;
   a vapor line, arranged to the vapor end of the ec-TES, for inlet and outlet of vapor;
   a liquid line arranged between the liquid end of the ec-TES and the liquid part of the ST;
   a tank vapor line arranged from the vapor part of the ST to the vapor line or the vapor end of the ec-TES; and
   an evaporation control valve (CV6) in the tank vapor line.

2. The thermal energy battery according to claim 1, comprising at least one of:
   a check valve in the tank vapor line, open for flow in direction from the ST and closed for flow in the opposite direction; and
   a flow control component in the vapor line between a vapor source/recipient and the connection point of the vapor line and the tank vapor line.

3. The thermal energy battery according to claim 1, comprising a superheater thermal energy storage (superheater TES), comprising one-phase stationary material storing at least 70% of the thermal energy stored within the superheater TES, arranged inline or to the vapor line between sources/recipients and the connection point of the vapor line and the tank vapor line.

4. The thermal energy battery according to claim 1, wherein the vapor line, towards a source/recipient, comprises a separate inlet vapor line and a separate outlet vapor line, wherein each of said vapor lines include a flow control component.

5. The thermal energy battery according to claim 1, comprising:
   a valve (CV1) arranged in the vapor line, controlling a supply of HP (high pressure) vapor to an inlet;
   a valve (CV2) arranged in the vapor line, controlling the delivery of LP (low pressure) vapor from an outlet;
   a line with a valve (CV3) for injecting HP condensate to the vapor line, for temperature control to avoid overheating, between the source and the connection point of the vapor line and the tank vapor line; and
   a drainage line with a valve, arranged from the liquid line.

6. The thermal energy battery according to claim 1, comprising:
   a superheater thermal energy storage (superheater TES);
   a superheater bypass line with a valve (CV4), arranged so as to bypass part or all the vapor flow through the superheater TES arranged inline to the vapor line; and
   a valve (CV5) in the vapor line between the superheater TES and the connection point of the vapor line and the tank vapor line.

7. The thermal energy battery according to claim 1, wherein the ec-TES consists of solid-state material and are solid-state material sensible thermal energy storages.

8. The thermal energy battery according to claim 1, wherein the ST, at least the liquid part thereof, is located at an equal elevation or a lower elevation than the liquid end of the ec-TES.

9. The thermal energy battery according to claim 1, comprising:
   electric resistive heating elements inside the ST for charging with electric power;
   preferably further comprising a liquid line to the liquid part of the ST, for supply of liquid during charge;
   for embodiments with superheater TES, an electric superheater arranged in a line from the vapor part of the ST to the vapor line between the vapor recipient and the superheater TES.

10. The thermal energy battery according to claim 6, wherein the ec-TES comprises a plurality of closely arranged concrete thermal energy storage elements with pipe heat exchangers fully embedded in the concrete between a pipe heat exchanger inlet and a pipe heat exchanger outlet in the same end or part of the element, an outer shell, being a concrete casting form, ring armoring and fluid leakage confiner, wherein the elements are horizontally oriented but vertically stacked, wherein the ec-TES vapor line is at a higher or highest elevation and ec-TES liquid line is at a lower or lowest elevation.

11. A method of operating a thermal energy storage battery according to claim 1, the method comprising:
   charging by supplying HP vapor, higher pressure vapor, from a source through the vapor line, with the tank vapor line closed or partly closed for the vapor by a closed or partly closed evaporation control valve or a check valve in the tank vapor line, until a maximum or desired pressure and temperature are reached; and
   discharging LP vapor, lower pressure vapor, to a recipient through the vapor line, controllable at least by the evaporation control valve, until a minimum or desired temperature and pressure is reached.

12. The method according to claim 11, wherein discharging is controlled by the evaporation control valve by maintaining an above saturation condition, to prevent liquid reaching the vapor end of the ec-TES.

13. The method according to claim 11, wherein:
charging takes place with the evaporation control valve closed; and
at least some of the vapor condensed in the ec-TES is accumulated as liquid in the ST by natural processes.

14. The method according to claim 11, wherein:
charging takes place with the evaporation control valve open and a check valve installed in the tank vapor line; and
wherein all or most of the vapor condensed in the ec-TES is accumulated as liquid in the ST by natural processes.

15. The thermal energy battery according to claim 1, comprising:
a superheater thermal energy storage (superheater TES);
a valve (CV1) arranged in the vapor line, controlling a supply of HP (high pressure) vapor to an inlet;
a valve (CV2) arranged in the vapor line, controlling the delivery of LP (low pressure) vapor from an outlet;
a line with a valve (CV3) for injecting HP condensate to the vapor line, for temperature control to avoid overheating, between source and the superheater TES; and
a drainage line with a valve, arranged from the liquid line.

16. The thermal energy battery according to claim 7, comprising:
a superheater thermal energy storage (superheater TES); and
wherein the superheater TES consists of solid-state material and are solid-state material sensible thermal energy storages.

17. The thermal energy battery according to claim 8, wherein the ST, at least the liquid part thereof, is arranged horizontally or as several vertical tanks in parallel.

18. The thermal energy battery according to claim 9, comprising:
electric resistive heating elements inside the ST for charging with electric power;
a liquid line to the liquid part of the ST, for supply of liquid during charge;
a superheater thermal energy storage (superheater TES); and
an electric superheater arranged in a line from the vapor part of the ST to the vapor line between the vapor recipient and the superheater TES.

19. The thermal energy battery according to claim 10, wherein:
the superheater TES comprises numerous closely arranged concrete thermal energy storage elements with pipe heat exchangers fully embedded in the concrete between a pipe heat exchanger inlet and a pipe heat exchanger outlet in the same end or part of the element; and
the outer shell is a metal shell.

* * * * *